(12) United States Patent
Chen et al.

(10) Patent No.: US 11,796,842 B2
(45) Date of Patent: Oct. 24, 2023

(54) BRAGG GRATING CHIP

(71) Applicant: IRIXI PHOTONICS (SUZHOU) CO., LTD., Suzhou (CN)

(72) Inventors: Yifan Chen, Suzhou (CN); Ting Yan, Suzhou (CN)

(73) Assignee: IRIXI PHOTONICS (SUZHOU) CO., LTD., Suzhou (CN)

( * ) Notice: Subject to any disclaimer, the term of this patent is extended or adjusted under 35 U.S.C. 154(b) by 127 days.

(21) Appl. No.: 17/608,464

(22) PCT Filed: Nov. 27, 2020

(86) PCT No.: PCT/CN2020/132087
§ 371 (c)(1),
(2) Date: Nov. 2, 2021

(87) PCT Pub. No.: WO2022/109982
PCT Pub. Date: Jun. 2, 2022

(65) Prior Publication Data
US 2023/0122040 A1    Apr. 20, 2023

(30) Foreign Application Priority Data

Nov. 26, 2020 (CN) .......................... 202011350444.X (51) Int. Cl.
*G02F 1/035* (2006.01)
*G02F 1/01* (2006.01)
*G02F 1/03* (2006.01)
(52) U.S. Cl.
CPC .......... *G02F 1/0147* (2013.01); *G02F 1/0311* (2013.01)

(58) Field of Classification Search
CPC ...... G02F 1/0147; G02F 1/0311; G02F 1/035; G02F 2201/307; G02F 2201/346
See application file for complete search history.

(56) References Cited

U.S. PATENT DOCUMENTS

| 9,257,814 B1 * | 2/2016 | Djordjevic .............. H01S 5/142 |
| 2009/0041405 A1 * | 2/2009 | Dai ..................... G01N 21/4133 385/12 |
| 2010/0303411 A1 | 12/2010 | Barsan et al. |

FOREIGN PATENT DOCUMENTS

| CN | 103257462 A | 8/2013 |
| CN | 104865223 A | 8/2015 |
| CN | 109358394 A | 2/2019 |
| CN | 110568551 A | 12/2019 |
| CN | 110911950 A | 3/2020 |

(Continued)

*Primary Examiner* — Joseph P Martinez
(74) *Attorney, Agent, or Firm* — SZDC LAW P.C.

(57) ABSTRACT

The present invention relates to a Bragg grating chip, which comprises a monocrystalline silicon substrate, a silicon dioxide layer arranged on the monocrystalline silicon substrate, a Bragg grating arranged on the silicon dioxide layer and a negative thermal-optical coefficient material arranged on the Bragg grating, so that the sensitivity of the Bragg grating based on lithium niobate crystals to temperature is eliminated, the drift amount of the reflection spectrum center wavelength of the Bragg grating chip in the environment temperature change of 1 k is basically zero, and the insensitivity of the spectral response of photoelectric devices such as optical filter, laser and the like formed by the lithium niobate Bragg grating to the temperature change can be realized.

7 Claims, 9 Drawing Sheets

(56) References Cited

FOREIGN PATENT DOCUMENTS

| CN | 110927871 A | 3/2020 |
| CN | 111090146 A | 5/2020 |
| CN | 111129920 A | 5/2020 |

* cited by examiner

BRAGG GRATING CHIP

CROSS REFERENCE TO RELATED APPLICATIONS

This application is the National Stage Application of PCT/CN2020/132087, filed on Nov. 27, 2020, which claims priority of Chinese Patent Application No. 202011350444.X, filed Nov. 26, 2020, the entire disclosures of which are incorporated herein by reference.

FIELD OF THE INVENTION

This application relates to a Bragg grating chip, and belongs to the field of photoelectric devices.

DESCRIPTION OF THE PRIOR ART

The Bragg grating structure has the property of reflecting light signals with specific wavelength, and can be used for manufacturing optical devices such as optical filter, resonant cavities of laser, sensor and the like. The lithium niobate crystal has good electro-optical effect, and resonant cavity or filter with tunable central wavelength can be obtained based on the Bragg grating of the lithium niobate crystal. However, the refractive index of lithium niobate material changes with the change of ambient temperature, and the thermal-optical coefficient thereof reaches around $3.5 \times 10^{-5}$, ambient temperature variations can lead to the obvious shift of the central wavelength of the reflection spectrum of the Bragg gating based on lithium niobate crystal, which will seriously affect the performances of resonant cavity, optical filter and sensor.

BRIEF SUMMARY OF THE INVENTION

The present invention aims to provide a Bragg grating chip, the central wavelength of the reflection spectrum of which is insensitive to the change of the ambient temperature.

To achieve the above purposes, the present invention is realized as the follow technical solution:

a Bragg grating chip comprises a monocrystalline silicon substrate, a silicon dioxide layer arranged on the monocrystalline silicon substrate, a Bragg grating arranged on the silicon dioxide layer and a negative thermal-optical coefficient material arranged on the Bragg grating, wherein the drift amount of the central wavelength of the reflection spectrum of the Bragg grating chip at the ambient temperature change of 1 k is basically zero.

Further, the material of the Bragg grating is lithium niobate crystal.

Further, the Bragg grating includes a plurality of grooves disposed on a top surface of the Bragg grating.

Further, the Bragg grating includes a plurality of grooves disposed on at least one side of the Bragg grating.

Further, the grooves of the Bragg grating are etched from any one of rectangular waveguide, ladder waveguide, and ridge waveguide.

Further, the Bragg grating is any one of uniform grating, non-uniform grating, sampled grating.

Further, the Bragg grating chip further comprises a cladding layer disposed on the negative thermal-optical coefficient material, the cladding layer being formed of silicon dioxide or silicon nitride.

Further, the Bragg grating chip further comprises a metal electrode disposed on the cladding layer, the metal electrode being energized to provide the Bragg grating chip having a tunable center wavelength.

Further, the negative thermal-optical coefficient material is selected from the group consisting of any one or more of titanium dioxide, zinc oxide, magnesium doped zinc oxide, polymethylmethacrylate, polystyrene, mechlorethamine plumbate.

Further, the thickness of the thermal-optical coefficient material is determined based on spectral simulation.

The beneficial effect of the present invention is: the negative thermal-optical coefficient material is arranged on the Bragg grating, so that the sensitivity of the Bragg grating based on the lithium niobate crystal to temperature is eliminated, the drift amount of the reflection spectrum center wavelength of the Bragg grating chip in the environmental temperature change of 1 k is basically zero, and the insensitivity of the spectral response of photoelectric devices such as optical filter, laser and the like formed by the lithium niobate Bragg grating to the temperature change can be realized.

The above description is only an outline of the technical schemes of the present invention. Preferred embodiments of the present invention are provided below in conjunction with the attached drawings to enable one with ordinary skill in the art to better understand said and other objectives, features, and advantages of the present invention and to make the present invention accordingly.

DETAILED DESCRIPTION OF THE PREFERRED EMBODIMENTS

Specific embodiments of the present invention are described in further detail in combination with the related drawings and embodiments below. However, in addition to the descriptions given below, the present invention can be applied to other embodiments, and the scope of the present invention is not limited by such, rather by the scope of the claims.

In addition, the technical features involved in the different embodiments of the present invention described below may be combined with each other as long as they do not conflict with each other.

The Bragg grating chip comprises a monocrystalline silicon substrate, a silicon dioxide layer arranged on the monocrystalline silicon substrate, a Bragg grating arranged on the silicon dioxide layer and a negative thermal-optical coefficient material arranged on the Bragg grating, wherein the drift amount of the central wavelength of the reflection spectrum of the Bragg grating chip in the environment temperature change of 1 k is basically zero, namely the Bragg grating chip is insensitive to the temperature.

The material of the Bragg grating is lithium niobate crystal material, the Bragg grating comprises a plurality of grooves, the grooves can be arranged on the top surface of the Bragg grating, however, the grooves can also be arranged on at least one side surface of the Bragg grating, namely, the grooves are arranged on one side surface or two side surfaces of the Bragg grating. The groove of the Bragg grating can be obtained by etching any one of the rectangular waveguide, the trapezoid waveguide and the ridge waveguide, namely the rectangular waveguide, the trapezoid waveguide and the ridge waveguide are firstly prepared and then etched to obtain the Bragg grating. However, the grooves of the Bragg grating may also be etched by other types of waveguides, and are not particularly limited herein. The Bragg grating is any one of a uniform grating, a non-uniform grating and a sampling grating, and is not particularly limited herein, and the specific structure of the Bragg grating can be selected according to actual needs.

The refractive indexes of the lithium niobate crystal material and the silicon dioxide are increased by the rise of the environmental temperature, and the thermal-optical coefficient of the lithium niobate crystal material reaches around $3.5 \times 10^{-5}$, the reflection wavelength of the ordinary lithium niobate Bragg grating structure is caused to drift along with the change of the environmental temperature, and in order to eliminate the influence of the temperature on the lithium niobate crystal material and the silicon dioxide, the negative thermal-optical coefficient material. The material may be selected from any one or more of titanium dioxide, zinc oxide, magnesium-doped zinc oxide, polymethyl methacrylate, polystyrene, and methylamine chloride plumbite, but is not limited thereto. The negative temperature coefficient material layer with proper thickness is arranged on the lithium niobate Bragg grating, so that the temperature sensitivity problem of the reflection wavelength of the lithium niobate Bragg grating is solved, and the insensitivity of the spectral response of photoelectric devices such as optical filter, laser and the like formed by the lithium niobate Bragg grating to the temperature change can be realized.

In addition, the Bragg grating chip also comprises a cladding layer arranged on the negative thermal-optical coefficient material so as to protect the negative thermal-optical coefficient material, and the material of the cladding layer is silica or silicon nitride.

The Bragg grating chip also comprises a metal electrode arranged on the cladding, and the metal electrode is electrified to obtain the Bragg grating chip with tunable central wavelength, so that devices such as resonant cavity or filter with tunable wavelength and the like can be prepared.

The thickness of the thermal-optical coefficient material is determined based on spectrum simulation, namely, for all combinations of distribution positions, grating periods, grating duty ratios, grating groove depths and different negative thermal-optical coefficient materials of the different lithium niobate Bragg grating, the required thickness of the negative thermal-optical coefficient material is also different, and the thickness can be set through spectrum simulation of the whole structure of the specific combination lithium niobate Bragg grating, so that the temperature-insensitive Bragg grating chip is obtained.

With respect to the preparation of Bragg grating chips, the silica layer can be grown by Plasma Enhanced Chemical Vapor Deposition (PECVD), Chemical Vapor Deposition (CVD), or Physical Vapor Deposition (PVD).

Preparing the Bragg grating: defining the position and shape of the waveguide by using electron beam lithography or optical lithography; then, finishing waveguide manufacturing by adopting Ironmilling, Reactive Ion Etch (ME), Inductively Coupled Plasma Etch (ICP-RIE), Wet Etch or Crystal Ion Slicing; and then the Bragg grating is prepared by photoetching or etching technology.

For negative thermal-optical coefficient materials: the titanium dioxide is prepared by processes such as Reactive Sputtering, RF Magnetron Sputtering, PECVD, CVD, Atomic Layer Deposition (ALD), Pulsed Laser Deposition (PLD) and the like; the zinc oxide and the magnesium-doped zinc oxide can also be prepared by processes such as Reactive Sputtering, RF Magnetron Sputtering, PECVD, CVD, ALD, PLD and the like; other organic materials can be prepared by simple Spin-Coating.

The present invention is further illustrated by the following specific examples.

Figure 1:
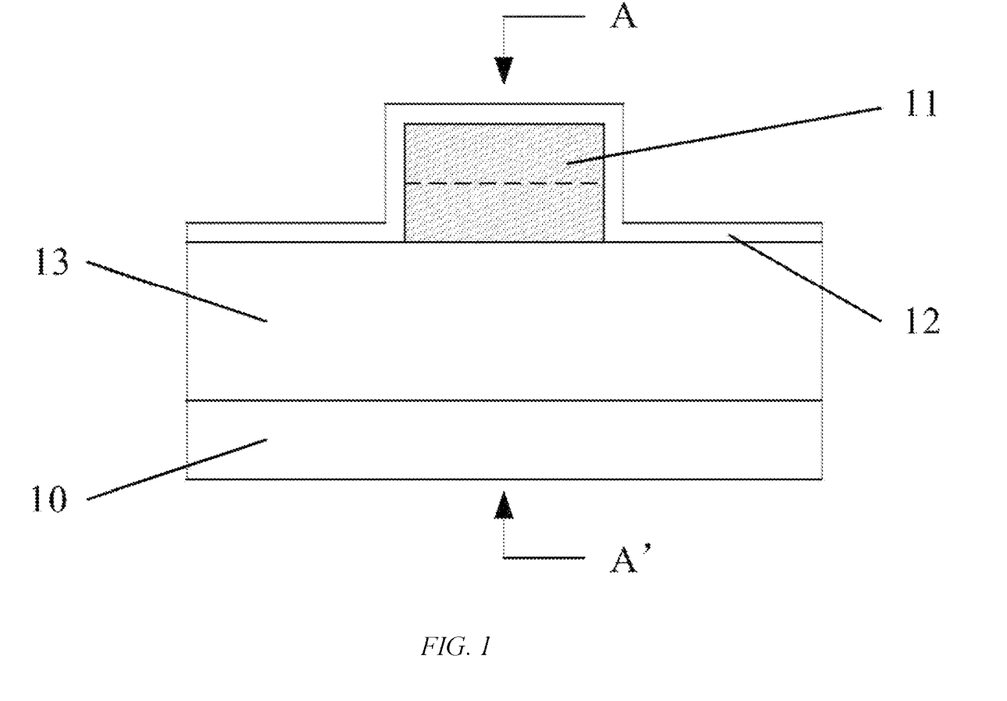
FIG. 1 is a schematic structural diagram of a lithium niobate Bragg grating chip according to embodiment one of the present invention.
Figure 2:
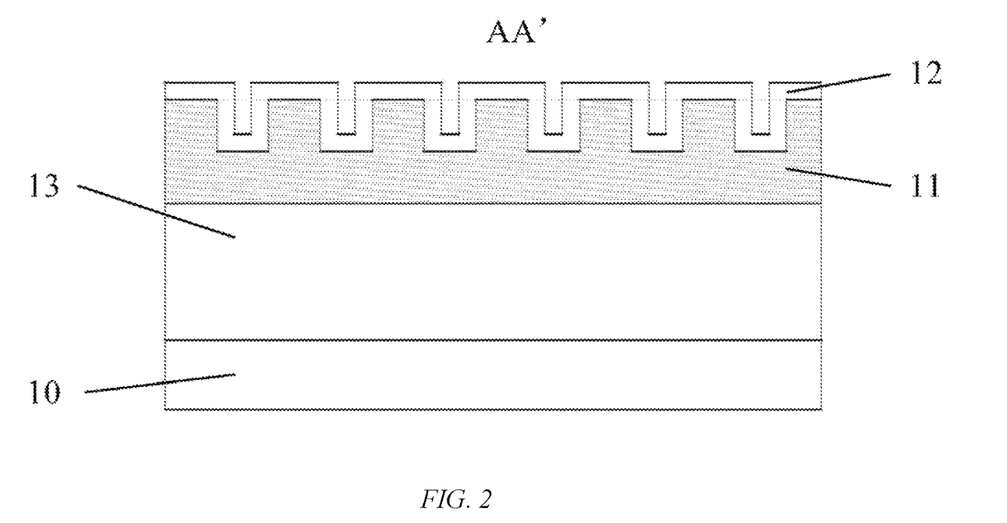
FIG. 2 is a cross-sectional view at AA' of FIG. 1.

Embodiment One: Lithium Niobate Bragg Grating Chip Based on Etching the Top Surface of Rectangular Waveguide Referring to FIGS. 1 and 2, in the present embodiment, the Bragg grating 11 is structurally distributed on the top surface of the lithium niobate rectangular waveguide, and the lithium niobate Bragg grating chip includes a monocrystalline silicon substrate 10, a Bragg grating 11, a titanium dioxide layer 22 disposed on the Bragg grating 11, and a silicon dioxide layer 13 disposed between the monocrystalline silicon substrate 10 and the Bragg grating 11. In FIG. 1, the dotted line indicates the position of the bottom surface of the trench of the Bragg grating 11, and a plurality of trenches of the Bragg grating 11 are formed on the top surface of the rectangular waveguide.

Figure 3:
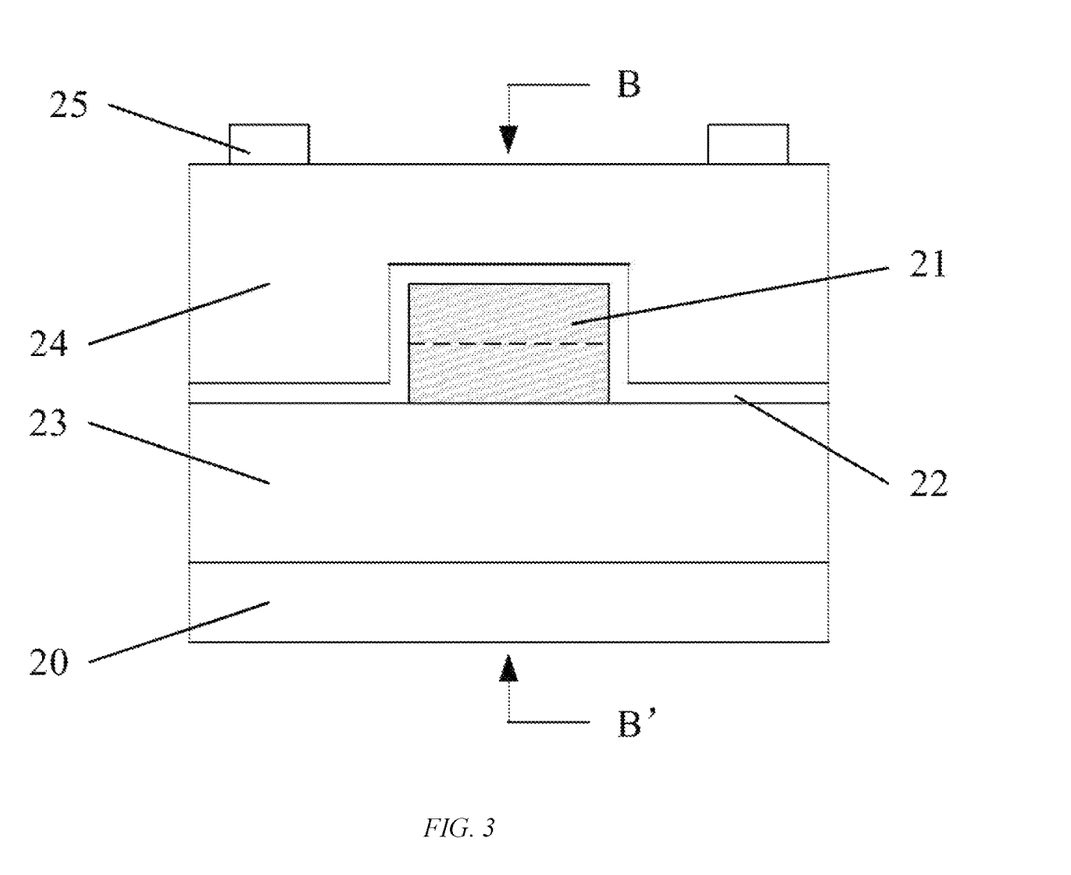
FIG. 3 is a schematic structural diagram of a lithium niobate Bragg grating chip according to embodiment two of the present invention.
Figure 4:
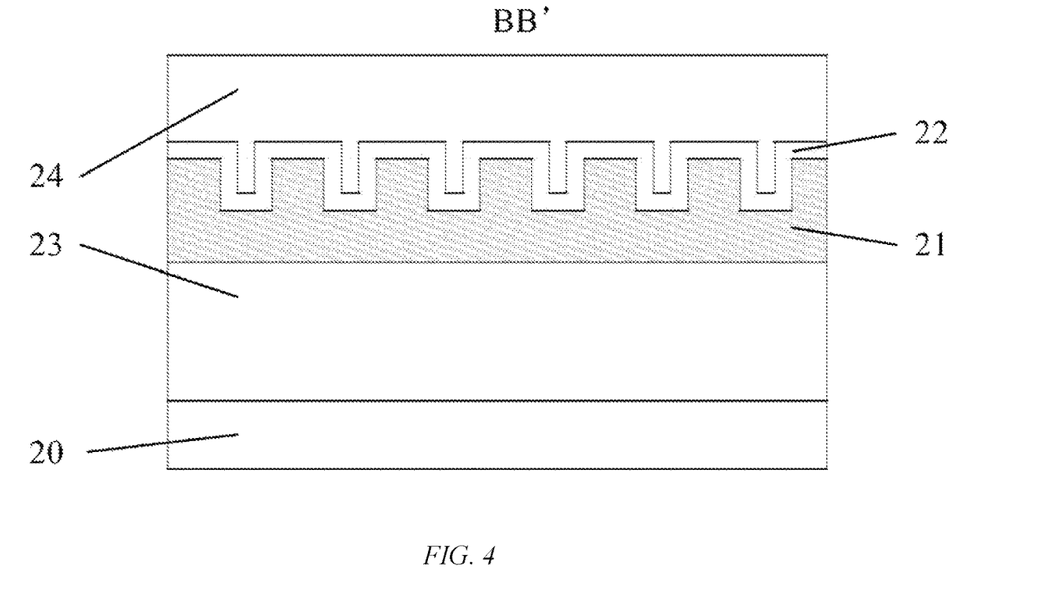
FIG. 4 is a cross-sectional view at BB' of FIG. 3.

Embodiment Two: Tunable Lithium Niobate Bragg Grating Chip Based on Etching the Top Surface of Rectangular Waveguide Referring to FIGS. 3 and 4, in the present embodiment, the Bragg grating 21 structure is distributed on the top surface of the lithium niobate rectangular waveguide, and the tunable lithium niobate Bragg grating chip includes a monocrystalline silicon substrate 20, a Bragg grating 21, a titanium dioxide layer 22 disposed on the Bragg grating 21, a silicon dioxide layer 23 disposed between the monocrystalline silicon substrate 20 and the Bragg grating 21, a silicon dioxide cladding layer 24 covering the Bragg grating 21 and the titanium dioxide layer 22, and a metal electrode 25 disposed on the silicon dioxide cladding layer 24. In FIG. 3, the dotted line indicates the position of the bottom surface of the groove of the Bragg grating 21, a plurality of grooves of the Bragg grating 21 are formed on the top surface of the rectangular waveguide, and the two metal electrodes 25 are energized, so that the central wavelength of the lithium niobate Bragg grating chip can be adjusted.

Figure 5:
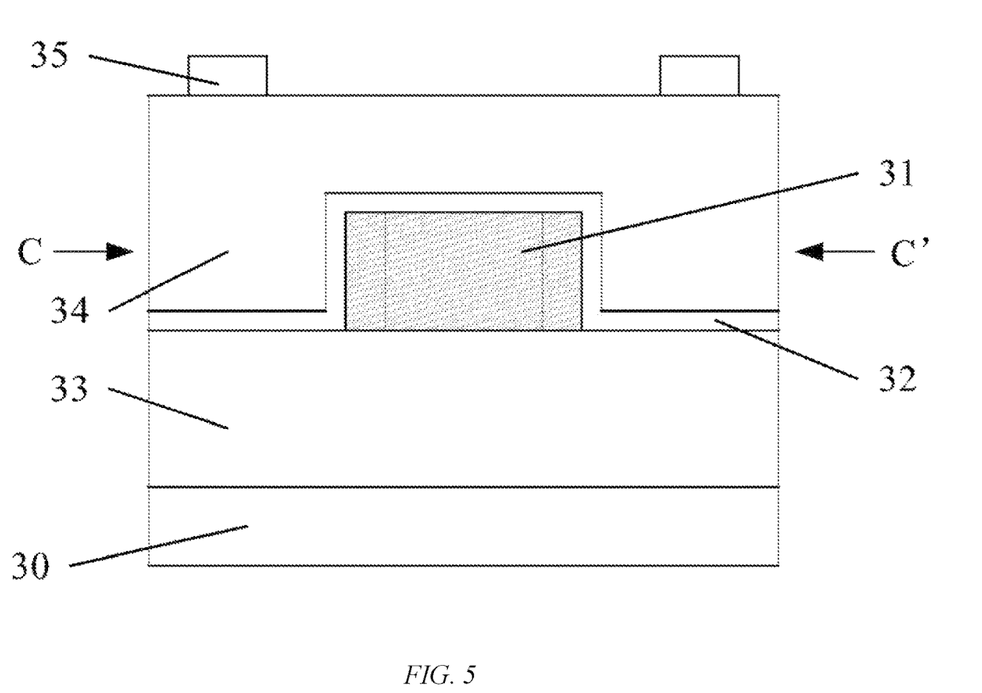
FIG. 5 is a schematic structural diagram of a lithium niobate Bragg grating chip according to embodiment three of the present invention.
Figure 6:
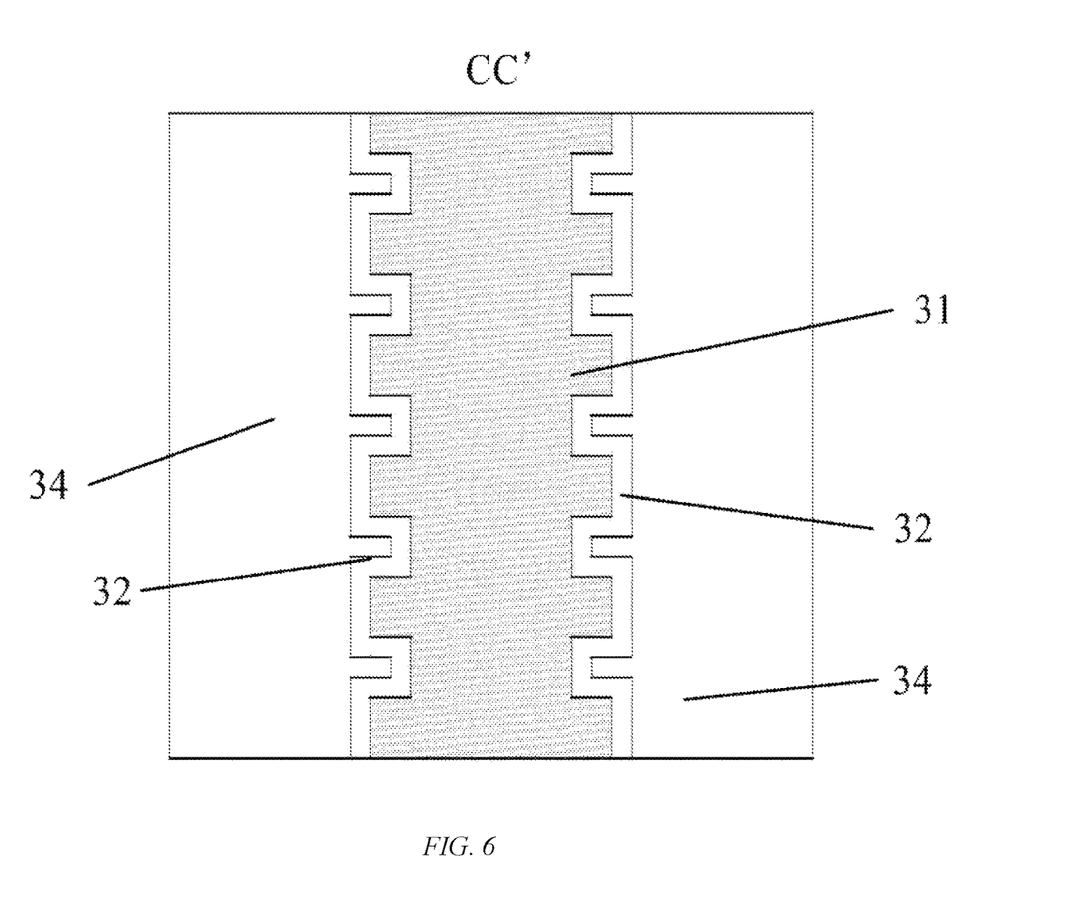
FIG. 6 is a cross-sectional view at CC' of FIG. 5.

Embodiment Three: Tunable Lithium Niobate Bragg Grating Chip Based on Etching of the Side Surface of Rectangular Waveguide Referring to FIGS. 5 and 6, in the present embodiment, the Bragg grating 31 structure is distributed on the side of the lithium niobate rectangular waveguide, and the tunable lithium niobate Bragg grating chip includes a monocrystalline silicon substrate 30, a Bragg grating 31, a titanium dioxide layer 32 disposed on the Bragg grating 31, a silicon dioxide layer 33 disposed between the monocrystalline silicon substrate 30 and the Bragg grating 31, a silicon dioxide cladding 34 covering the Bragg grating 31 and the titanium dioxide layer 32, and a metal electrode 35 disposed on the silicon dioxide cladding 34. In FIG. 5, the dotted line indicates the position of the bottom surface of the groove of the Bragg grating 31, a plurality of grooves of the Bragg grating 31 are formed on two side surfaces of the rectangular waveguide, and the center wavelength of the lithium niobate Bragg grating chip can be adjusted by electrifying the two metal electrodes 35.

Figure 7:
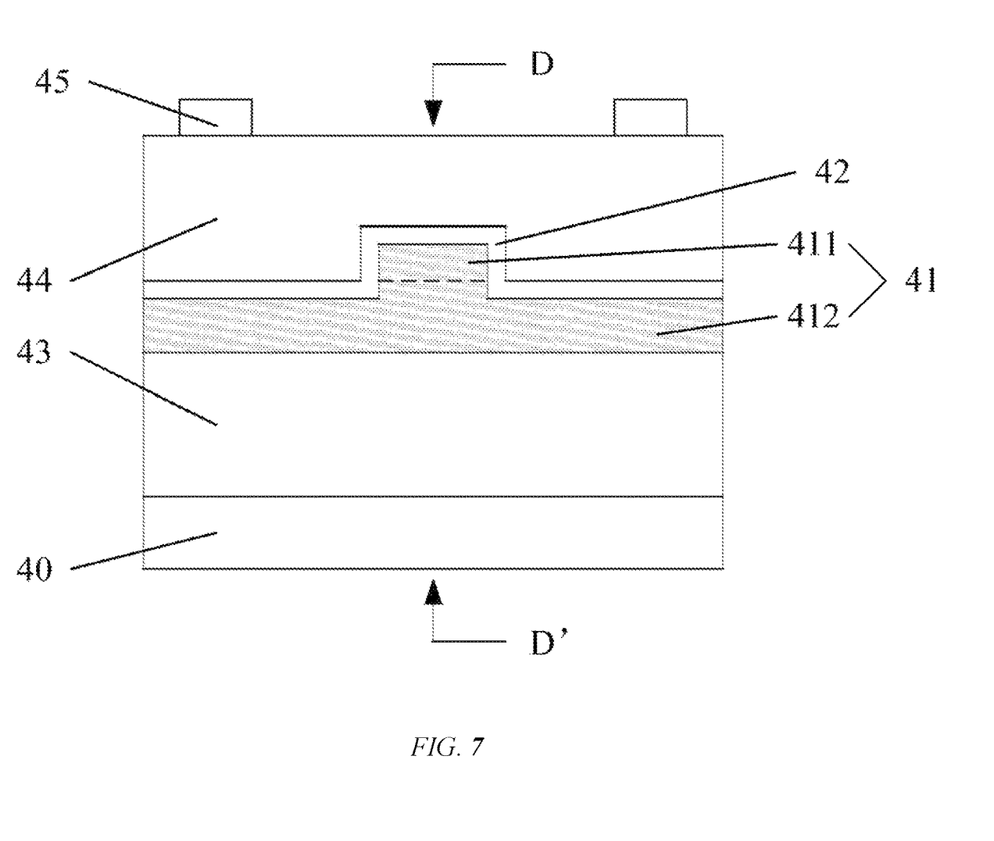
FIG. 7 is a schematic structural diagram of a lithium niobate Bragg grating chip according to embodiment four of the present invention.
Figure 8:
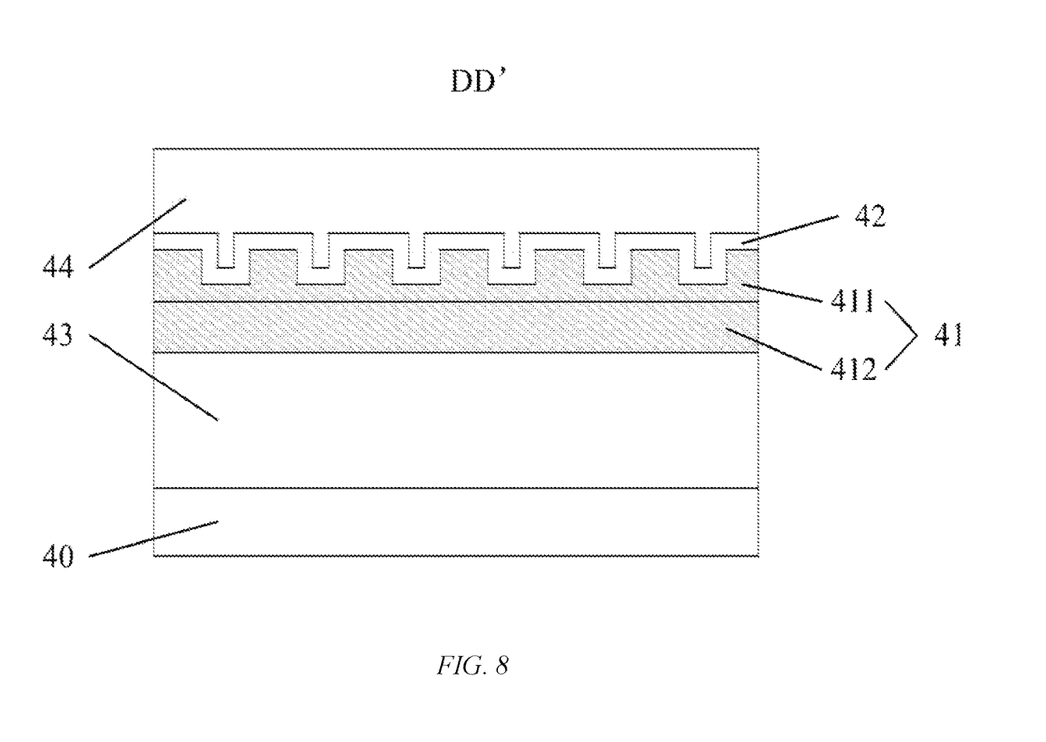
FIG. 8 is a cross-sectional view at DD' of FIG. 7.

Embodiment Four: Tunable Lithium Niobate Bragg Grating Chip Based on Etching the Top Surface of Ridge Waveguide Referring to FIGS. 7 and 8, in the present embodiment, the Bragg grating 41 structure is distributed on the top surface of the lithium niobate ridge waveguide, and the tunable lithium niobate Bragg grating chip includes a monocrystalline silicon substrate 40, a Bragg grating 41, a titanium dioxide layer 42 disposed on the Bragg grating 41, a silicon dioxide layer 43 disposed between the monocrystalline silicon substrate 40 and the Bragg grating 41, a silicon dioxide cladding 44 covering the Bragg grating 41 and the titanium dioxide layer 42, and a metal electrode 45 disposed on the silicon dioxide cladding 44. In FIG. 7, the dashed lines indicate the positions of the bottom surfaces of the grooves of the Bragg grating 41, wherein a plurality of grooves of the Bragg grating 41 are formed on the top surface of the central ridge 411 of the ridge waveguide, the central ridge 411 is formed on the flat plate layer 412, and the central wavelength of the lithium niobate Bragg grating chip can be adjusted by electrifying the two metal electrodes 45.

Figure 9:
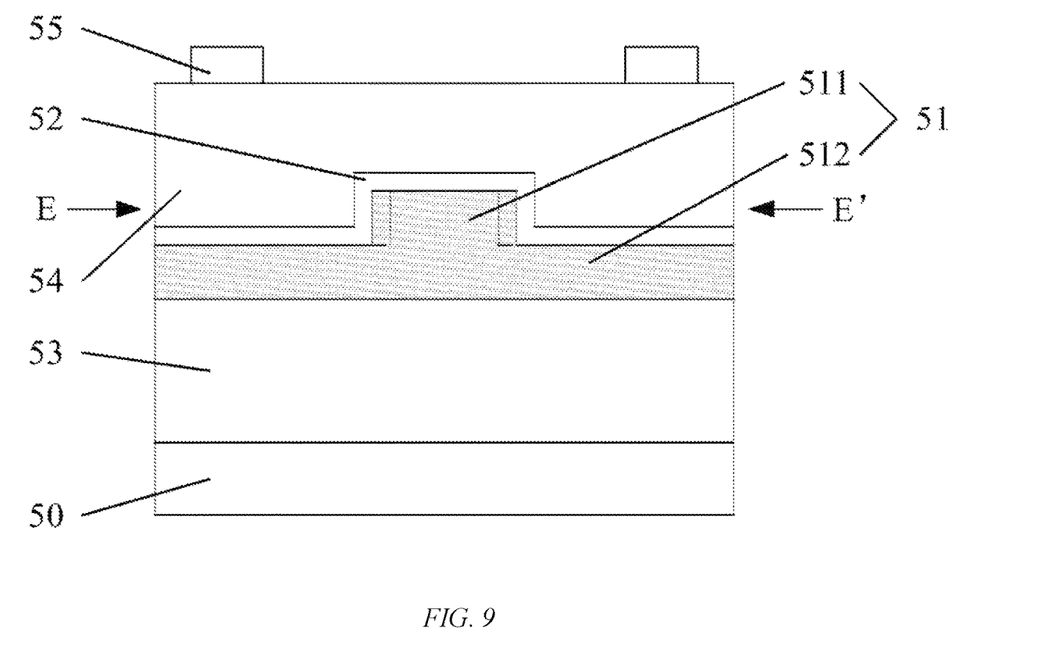
FIG. 9 is a schematic structural diagram of a lithium niobate Bragg grating chip according to embodiment five of the present invention.
Figure 10:
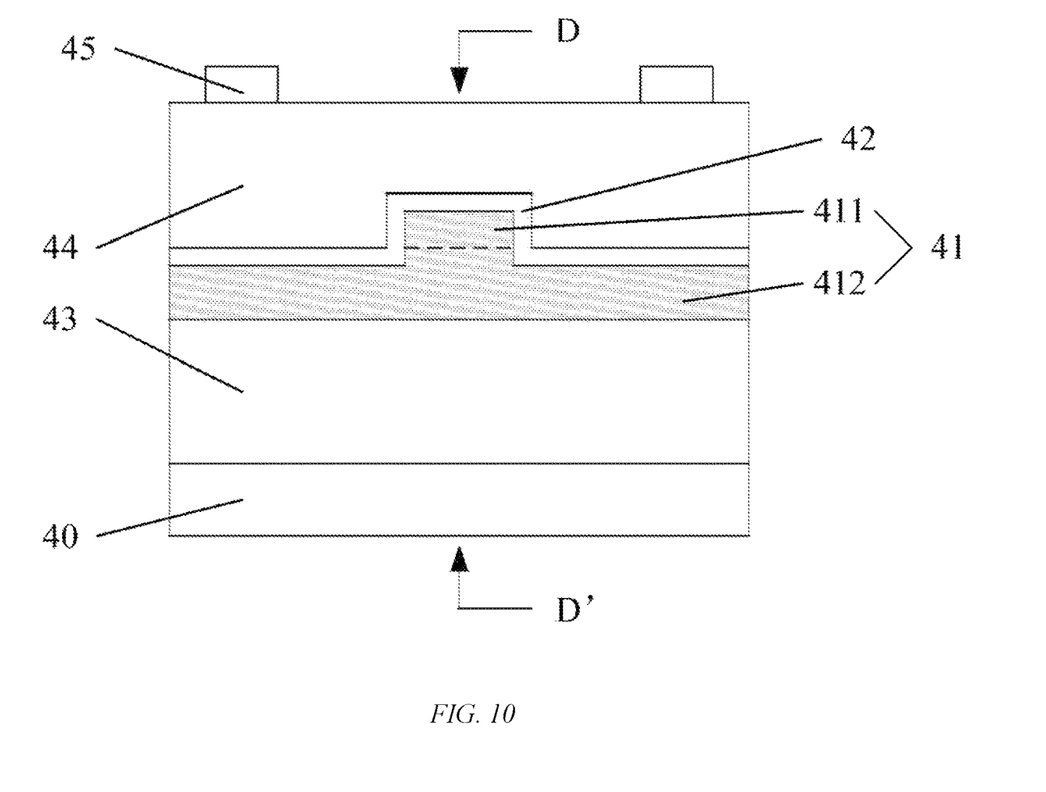
FIG. 10 is a cross-sectional view at EE' of FIG. 9.

Embodiment Five: Tunable Lithium Niobate Bragg Grating Chip Based on Etching the Side Surface of Ridge Waveguide Referring to FIGS. 9 and 10, in the present embodiment, the Bragg grating 51 structure is distributed on the side of the lithium niobate ridge waveguide, and the tunable lithium niobate Bragg grating chip includes a monocrystalline silicon substrate 50, a Bragg grating 51, a titanium dioxide layer 52 disposed on the Bragg grating 51, a silicon dioxide layer 53 disposed between the monocrystalline silicon substrate 50 and the Bragg grating 51, a silicon dioxide cladding 44 covering the Bragg grating 51 and the titanium dioxide layer 52, and a metal electrode 55 disposed on the silicon dioxide cladding 54. In FIG. 9, the dotted lines indicate the positions of the bottom surfaces of the grooves of the Bragg grating 51, wherein a plurality of grooves of the Bragg grating 51 are formed on two side surfaces of a central ridge 511 of the ridge waveguide, the central ridge 511 is formed on the flat plate layer 512, and the central wavelength of the lithium niobate Bragg grating chip can be adjusted by energizing the two metal electrodes 55.

To sum up, the negative thermal-optical coefficient material is arranged on the Bragg grating, so that the sensitivity of the Bragg grating based on the lithium niobate crystal to temperature is eliminated, the drift amount of the reflection spectrum center wavelength of the Bragg grating chip in the environmental temperature change of 1 k is basically zero, and the insensitivity of the spectral response of photoelectric devices such as optical filter, laser and the like formed by the lithium niobate Bragg grating to the temperature change can be realized.

The technical features of the above embodiments can be combined arbitrarily, in order to make the description concise, not all possible combinations of the technical features in the above embodiments are described. However, as long as there is no contradiction between the combination of these technical features, they shall be considered to be within the scope of this specification.

The present invention only described several above embodiments, which are described more specific and detailed, but it cannot be understood as a limitation on the scope of the present invention. It should be pointed out that for ordinary technical personnel in the art, without departing from the concept of the present invention, a number of deformation and improvements can be made, which belong to the scope of the present invention. Therefore, the scope of the present invention shall be subject to the recorded claims.

The invention claimed is:

1. A Bragg grating chip, characterized in that comprising a monocrystalline silicon substrate, a silicon dioxide layer arranged on the monocrystalline silicon substrate, a Bragg grating arranged on the silicon dioxide layer and a negative thermal-optical coefficient material arranged on the Bragg grating, wherein the drift amount of the central wavelength of the reflection spectrum of the Bragg grating chip at the ambient temperature change of 1 k is zero;

the Bragg grating chip further comprises a cladding layer disposed on the negative thermal-optical coefficient material, the cladding layer being formed of silicon dioxide or silicon nitride;

the Bragg grating chip further comprises a metal electrode disposed on the cladding layer, the metal electrode being energized to provide the Bragg grating chip with a tunable center wavelength; and the negative thermal-optical coefficient material is selected from the group consisting of titanium dioxide, zinc oxide, magnesium doped zinc oxide, polymethylmethacrylate, polystyrene, mechlorethamine plumbate.

2. The Bragg grating chip according to claim 1, characterized in that the material of the Bragg grating is lithium niobate crystal.

3. The Bragg grating chip according to claim 1, characterized in that the Bragg grating includes a plurality of grooves disposed on a top surface of the Bragg grating.

4. The Bragg grating chip according to claim 3, characterized in that the grooves of the Bragg grating are etched from any one of rectangular waveguide, ladder waveguide, and ridge waveguide.

5. The Bragg grating chip according to claim 1, characterized in that the Bragg grating includes a plurality of grooves disposed on at least one side of the Bragg grating.

6. The Bragg grating chip according to claim 1, characterized in that the Bragg grating is any one of uniform grating, non-uniform grating, sampled grating.

7. The Bragg grating chip according to claim 1, characterized in that the thickness of the thermal-optical coefficient material is determined based on spectral simulation.

\* \* \* \* \*